US009963911B1

(12) United States Patent
Downs

(10) Patent No.: US 9,963,911 B1
(45) Date of Patent: May 8, 2018

(54) PADLOCK FOR AMMUNITION CASES AND METHOD OF USE

(71) Applicant: Edward Downs, Miramar, FL (US)

(72) Inventor: Edward Downs, Miramar, FL (US)

(*) Notice: Subject to any disclaimer, the term of this patent is extended or adjusted under 35 U.S.C. 154(b) by 0 days. days.

(21) Appl. No.: 15/439,937

(22) Filed: Feb. 22, 2017

(51) Int. Cl.
  E05B 43/00  (2006.01)
  E05B 37/00  (2006.01)
  E05B 17/10  (2006.01)
  G04F 1/00   (2006.01)
  G01S 19/03  (2010.01)

(52) U.S. Cl.
  CPC ............ E05B 43/00 (2013.01); E05B 17/10 (2013.01); E05B 37/0034 (2013.01); G01S 19/03 (2013.01); G04F 1/005 (2013.01)

(58) Field of Classification Search
  CPC .......... E05B 43/00; E05B 73/00; E05B 17/10; E05B 37/0034; G01S 19/03; G04F 1/005
  See application file for complete search history.

(56) References Cited

U.S. PATENT DOCUMENTS

| 5,406,257 | A  | * | 4/1995 | Saito ................. | B62H 5/20 340/427 |
| 7,007,521 | B1 | * | 3/2006 | Misner ............... | E05B 35/105 70/21 |
| 8,482,411 | B1 | * | 7/2013 | Brown ................ | E05B 45/005 340/539.31 |
| 2006/0150690 | A1 | * | 7/2006 | Lai ................... | E05B 35/105 70/21 |
| 2007/0252675 | A1 | * | 11/2007 | Lamar ............... | B25F 5/00 340/5.64 |
| 2009/0134209 | A1 | * | 5/2009 | Tonaltzin ........... | A45C 13/10 229/116.1 |
| 2014/0366419 | A1 | * | 12/2014 | Allan ................ | F41A 17/06 42/70.06 |
| 2016/0002953 | A1 | * | 1/2016 | Sada ................. | E05B 67/00 70/269 |
| 2017/0009491 | A1 | * | 1/2017 | Nguyen ............ | E05B 67/10 |

* cited by examiner

Primary Examiner — Thomas Alunkal
(74) Attorney, Agent, or Firm — Ruben Alcoba, Esq.

(57) ABSTRACT

A padlock having a locking mechanism that can be unlocked using a thumbwheel, by a traveler, or by secured key, by a TSA or government agent. The Padlock has a timer that prevents the lock from unlocking for a set period of time. The padlock also has a switch that activates the activation of the timer. The activation of the timer activates the timer so that the lock cannot be unlocked until the following sequence is completed: first the padlock unlocking mechanism is activated by dialing the correct code on the thumbwheel of the padlock and thereby starting a set time period for the automatic release of the padlock and second by the lock automatically unlocking after the set period expiring. The padlock also has a bypass mechanism that bypasses the timer sequence and thereby unlocks the lock. The padlock may also have at least one light that notifies a handler of the padlock of the activation of the timer and/or the release of the padlock. The padlock may also have a stopwatch that displays the period of time left before the padlock is unlocked.

9 Claims, 2 Drawing Sheets

PADLOCK FOR AMMUNITION CASES AND METHOD OF USE

BACKGROUND

Figure 1:
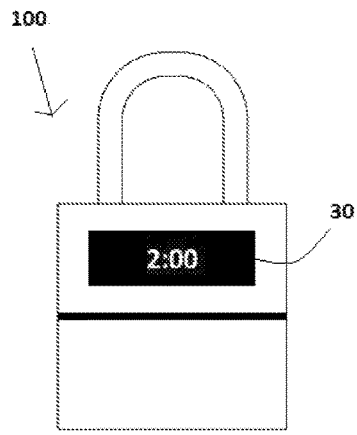

The present invention is directed to a padlock that is used to lock ammunition cases that will prevent and deter terrorist or criminal acts at airports of ports of entry.

In the United States, ammunition is prohibited in carry-on baggage, but may be transported in checked baggage. Firearm magazines and ammunition clips, whether loaded or empty, must be securely boxed or included within a hard-sided case containing an unloaded firearm. Read the requirements governing the transport of ammunition in checked baggage as defined by 49 CFR 175.10 (a)(8).

Recently, at a Florida Airport, a terrorist attack occurred wherein a traveler picked up his gun and ammunition case at a secured weapon baggage pickup, then he went into a bathroom, next he loaded the weapons he was carrying in the bathroom, and lastly, he opened fire at his fellow travelers.

The terrorist attack could have been prevented by having a lock on the ammunition carrying case that would have not been able to have been unlocked for a period of time after the case was delivered to the traveler.

The incident motivated the inventor of the present inventor to device a padlock that could have a timing device that would prevent the case from being opened after the delivery of the case to a traveler at an airport or port of entry.

The present invention provides a padlock, that will be used on ammunition carrying cases that are checked into an airports or ports of entry, that will be used to prevent or deter terrorism at airports or ports of entry.

For the foregoing reasons he designed a TSA improved padlock for carrying cases that will be used to prevent or deter terrorism or criminal acts at airports or ports of entry.

SUMMARY

The present invention describes a TSA improved padlock for carrying cases that will prevent or deter terrorism or criminal acts at airports or ports of entry.

The present invention comprises of a padlock having a locking mechanism that can be unlocked using a thumbwheel, by a traveler, or by secured key, by a TSA or government agent. The Padlock further comprises of a timer that prevents the padlock from unlocking for set period of time, the timer sequence, after the lock is unlocked by the thumbwheel. The padlock also has a switch that activates the activation of the timer. The activation of the timer activates the timer so that the lock cannot be unlocked until the following sequence is completed: first the padlock unlocking mechanism is activated by dialing the correct code on the thumbwheel of the padlock and thereby starting a set time period for the automatic release of the padlock and second by the lock automatically unlocking after the set period expires. The lock also has a bypass mechanism that bypasses the timer sequence and thereby unlock the lock. The bypass mechanism is activated by the secure key that is used by the TSA or governmental agent. In alternative embodiments of the present invention, the padlock may further comprise of at least one light that will notify a handler of the padlock of the activation of the timer and/or the release of the padlock. In a further embodiment, the padlock has a stopwatch that can be used by the traveler or the agent to determine the period of time left before the padlock is unlocked.

As an added security feature, the padlock may further comprise of a chip or GPS tracking device that will prevent the timer from starting until the padlock is a certain distance from an airport or port of entry.

An objective of the present invention is to provide a padlock that will be used on ammunition cases to prevent terrorism or criminal acts at airports or port of entry.

Another objective of the present invention is to provide a padlock that can be used by a TSA or a governmental agent to ensure the safety at airports or ports of entry.

A further objective of the present invention is to provide a padlock that will allow a TSA or a governmental agent to monitor the location of an ammunition case secured by the padlock and an ETA (estimated time of action) of the unlocking mechanism.

DRAWINGS

Figure 2:
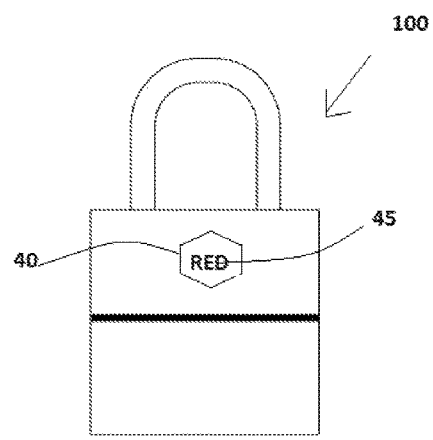
Figure 3:
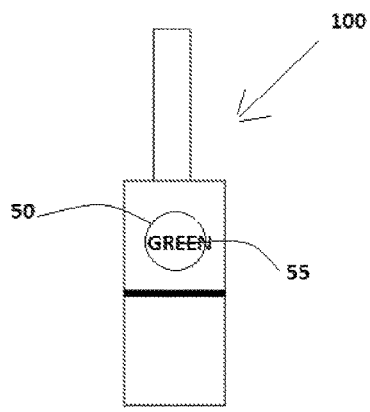
Figure 4:
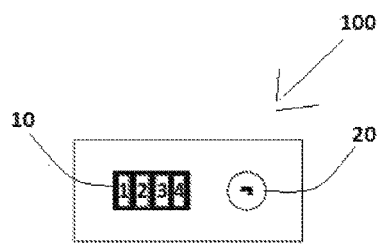
Figure 5:
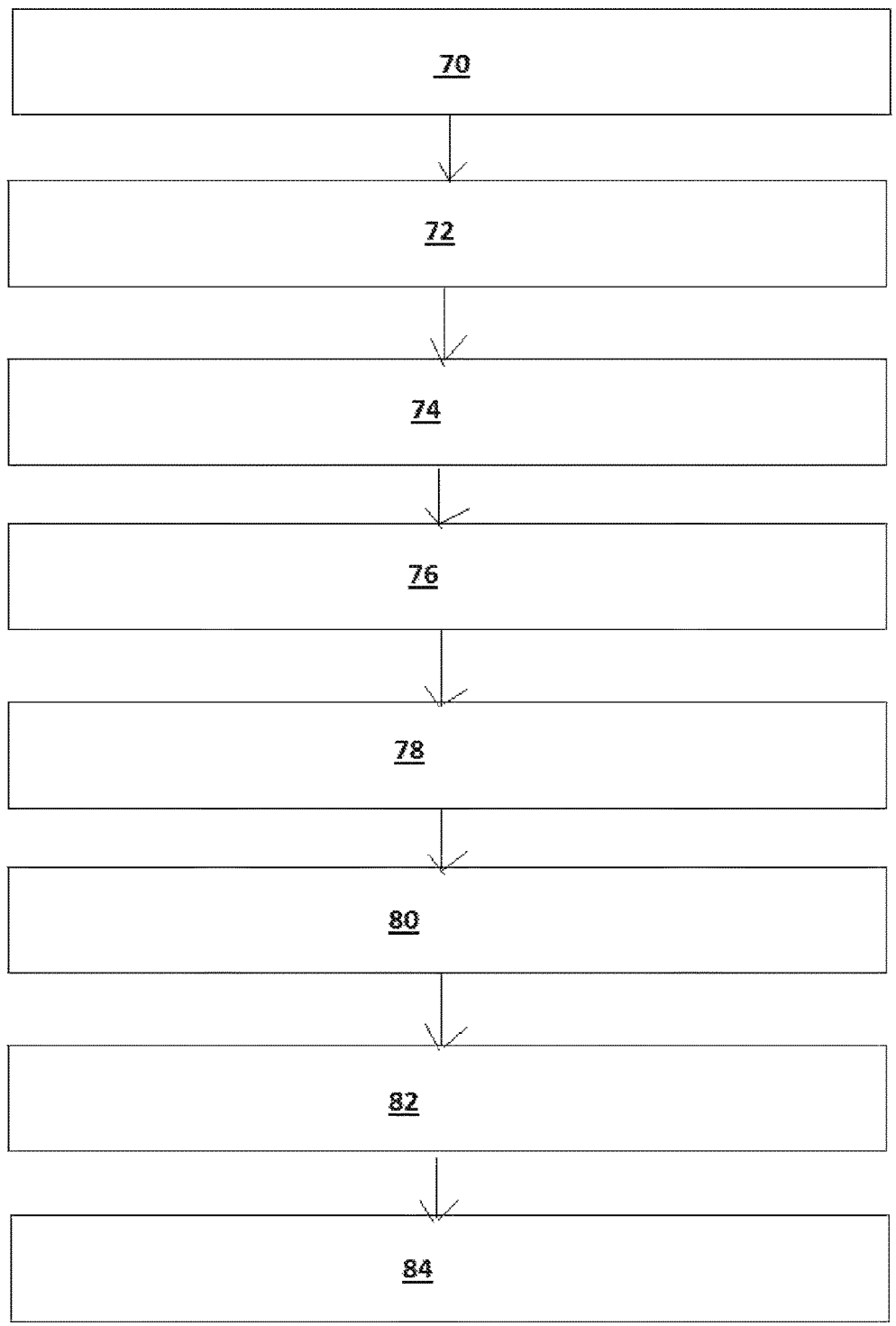

These and other features, aspects, and advantages of the present invention will become better understood with regard to the following description, appended claims, and drawings where:

FIG. 1 is a front view of a padlock;
FIG. 2 is a back view of the padlock;
FIG. 3 is a side view of the padlock;
FIG. 4 is bottom view of the padlock; and
FIG. 5 is a schematic of the method of using the present invention, wherein each numeric element shown in the drawings is explained in the DESCRIPTION of the present application.

DESCRIPTION

As seen in FIGS. 1-5, the present invention comprises of an improved padlock 100 for ammunition cases and its method of use. The padlock 100 comprises of a padlock 100 having a thumbwheel locking and unlocking mechanism 10 and an adjacent secured key unlocking mechanism 20, the secured key unlocking mechanism 20 being a bypass of the thumbwheel locking mechanism 10. The padlock 100 has a timer 30 that is operatively connected to the thumbwheel locking and unlocking mechanism 10 that prevents the unlocking of the padlock 100 upon the thumbwheel unlocking mechanism 10 being activated to unlock until a set time period has expired. The padlock 100 has a first switch 40 and a first indicator light 45 that are operatively connected to the thumbwheel locking and unlocking mechanism 10, the first switch 40, upon it being switched on, activates the first indicator light 45 to indicate that the padlock 100 is locked. And, the padlock 100 has a second switch 50 and a second indicator light 55 that are operatively connected to the thumbwheel locking and unlocking mechanism 10. The second switch 50, upon it being switched on after a thumbwheel code is dialed on the thumbwheel locking and unlocking mechanism 10, activates the second indicator light 55 for a set period of time and activates the timer 30 to unlock the padlock 100 upon the set time period expiring.

In an embodiment of the present invention, the padlock has a GPS tracking device (not shown in figures) that prevents the set time from running until the padlock 100 is out of a secured zone such as an airport or a port of entry.

In another embodiment of the present invention, the bypass resets the timer 30.

In yet another embodiment of the present invention, the first light indicator 40 is red and will turn off upon the set time period expiring.

In still another embodiment of the present invention, the second light indicator 55 will give a first signal that the timer has been activated and that will give a second signal upon the time period expiring.

In yet still another embodiment of the present invention, the first signal is a short flashing signal emanating from the second light indicator 55 and the second signal will be the second light indicator 55 remaining on for a set period of time.

In a further embodiment, the second light indicator 55 is a green light.

The present invention is used at airports or ports of entry as follows: first, by providing a padlock 70 as described above; then, providing an ammunition case 72; next, locking the padlock on the ammunition case 74 and switching on the first light indicator of the padlock 76 at a first airport or a first port of entry; then, sending the ammunition case 78 to a second airport or second port of entry; next, retrieving the ammunition case 80 at the second airport or second port of entry; then, switching the second switch 82 after dialing the thumbwheel code; and lastly, waiting for a set period of time 84 to expire so that the padlock is unlocked. The present invention may also be unlocked by a TSA or governmental agent by bypassing the thumbwheel locking and unlocking mechanism using the secure key unlocking mechanism of the present invention and thereby resetting the timer.

An advantage of the present invention is that it provides a padlock that is used on ammunition cases to prevent terrorism or criminal acts at airports or port of entry.

Another advantage of the present invention is that it provides a padlock that is used by a TSA or a governmental agent to ensure the safety at airports or ports of entry.

A further advantage of the present invention is that it provides a padlock that allows a TSA or a governmental agent to monitor the location of an ammunition case secured by the padlock and an ETA (estimated time of action) of the unlocking mechanism.

While the inventor's above description contains many specificities, these should not be construed as limitations on the scope, but rather as an exemplification of several preferred embodiments thereof. Accordingly, the scope should be determined not by the embodiments illustrated, but by the appended claims and their legal equivalents.

What is claimed is:

1. An improved padlock for ammunition cases, the padlock comprises:
    a padlock having a thumbwheel locking and unlocking mechanism and an adjacent secured key unlocking mechanism, the secured key unlocking mechanism being a bypass of the thumbwheel locking mechanism;
    a timer that is operatively connected to the thumbwheel locking and unlocking mechanism that prevents the unlocking of the padlock upon the thumbwheel unlocking mechanism being activated to unlock until a set time period has expired, the secured key unlocking mechanism is used to unlock the padlock after the thumbwheel unlocking mechanism is activated by the timer to lock the padlock and thereby works as a bypass to the thumbwheel unlocking mechanism;
    a first switch and a first indicator light that are operatively connected to the thumbwheel locking and unlocking mechanism, the first switch, upon it being switched on, activates the first indicator light to indicate that the padlock is locked; and
    a second switch and a second indicator light that are operatively connected to the thumbwheel locking and unlocking mechanism, the second switch, upon it being switched on after a thumbwheel code is dialed on the thumbwheel locking and unlocking mechanism, activates the second indicator light for a set period of time and activates the timer to unlock the padlock upon the set time period expiring.

2. The improved padlock for ammunition cases of claim 1, the padlock comprises a GPS tracking device that prevents the set time from running until the padlock is out of a secured zone such as an airport or a port of entry.

3. The improved padlock for ammunition cases of claim 1, wherein the bypass resets the timer.

4. The improved padlock for ammunition cases of claim 1, wherein the first light indicator is red and will turn off upon the set time period expiring.

5. The improved padlock for ammunition cases of claim 4, wherein the second light indicator will give a first signal that the timer has been activated and that will give a second signal upon the time period expiring.

6. The improved padlock for ammunition cases of claim 5, wherein the first signal is a short flashing signal emanating from the second light indicator and the second signal will be the second light indicator remaining on for a set period of time.

7. The improved padlock for ammunition cases of claim 6, wherein the second light indicator is a green light.

8. A method of using an improved padlock for ammunition cases, the method comprising: Providing a padlock as described in claim 7;
    Providing an ammunition case;
    Locking the padlock on the ammunition case and switching on the first light indicator of the padlock at a first airport or a first port of entry;
    Sending the ammunition case to a second airport or second port of entry;
    Retrieving the ammunition case at the second airport or second port of entry;
    Switching the second switch after dialing the thumbwheel code; and
    Then, waiting for a set period of time to expire so that the padlock is unlocked.

9. A method of using an improved padlock for ammunition cases of claim 8, the method comprising bypassing the thumbwheel locking and unlocking mechanism using the secure key unlocking mechanism.

* * * * *